United States Patent [19]

Ogawa et al.

[11] Patent Number: 5,525,062
[45] Date of Patent: Jun. 11, 1996

[54] TRAINING APPARATUS FOR SINGING

[75] Inventors: Nobuyuki Ogawa, Takatsuki; Tatsuhiko Numoto, Osaka; Koji Watanabe, Hirakata; Kenji Muraki, Osaka, all of Japan

[73] Assignee: Matsushita Electric Industrial Co. Ltd., Osaka, Japan

[21] Appl. No.: 221,393

[22] Filed: Mar. 31, 1994

[30] Foreign Application Priority Data

Apr. 9, 1993 [JP] Japan .................................. 5-082998
Apr. 9, 1993 [JP] Japan .................................. 5-082999

[51] Int. Cl.⁶ .................................................. G10H 1/36
[52] U.S. Cl. .......................... 434/307 A; 434/307 R; 434/318; 84/610; 358/342
[58] Field of Search ................... 434/307 R, 307 A, 434/308, 309, 318, 365; 84/454, 477 R, 601, 609, 610, 611, 615, 625, 645; 348/478, 484, 571, 595, 738; 358/310, 335, 342; 379/110; 360/33.1, 77.01; 369/32, 48, 50; 395/2.29, 2.3, 152, 154, 425

[56] References Cited

U.S. PATENT DOCUMENTS

| | | |
|---|---|---|
| 3,808,936 | 5/1974 | Shrader . |
| 3,919,913 | 11/1975 | Shrader . |
| 4,745,836 | 5/1988 | Dannenberg . |
| 5,208,679 | 5/1993 | Yamauchi et al. ................... 358/342 |
| 5,233,438 | 8/1993 | Funahashi et al. .................. 358/342 X |
| 5,247,126 | 9/1993 | Okamura et al. .................... 84/477 R X |
| 5,287,789 | 2/1994 | Zimmerman ........................... 84/454 X |
| 5,296,643 | 3/1994 | Kuo et al. ............................ 84/477 R X |
| 5,395,123 | 3/1995 | Kondo ................................... 434/307 A X |

FOREIGN PATENT DOCUMENTS

| | | |
|---|---|---|
| 643585 | 7/1992 | Australia ............................. 434/307 A |
| 52-70624 | 6/1977 | Japan . |
| 53-44234 | 4/1978 | Japan . |
| 56-85773 | 7/1981 | Japan . |
| 58-149096 | 9/1983 | Japan . |
| 3-226786 | 10/1991 | Japan . |

OTHER PUBLICATIONS

Search Report dated Jun. 8, 1994.

*Primary Examiner*—Joe Cheng
*Attorney, Agent, or Firm*—Ratner & Prestia

[57] ABSTRACT

A vocal training apparatus accomplishes reproduction of a music signal recorded on an information medium, where the music signal includes a model vocal signal and an accompaniment signal. A model vocal signal is extracted from the music signal and a singer's vocal signal is received. The model vocal characteristics are measured from the model vocal signal and the singer's vocal characteristics are measured from the singer's vocal signal. The singer's vocal characteristics and the model vocal characteristics can then be compared to evaluate the singer's vocal characteristics relative to the model vocal characteristics.

15 Claims, 14 Drawing Sheets

: Red
: Green
: Blue

TRAINING APPARATUS FOR SINGING

BACKGROUND OF THE INVENTION

1. Field of the Invention

The present invention generally relates to an apparatus for performing accompaniment to allow a singer to sing a song into a microphone. This is presently known as karaoke.

More particularly, the present invention relates to a video apparatus or an audio apparatus such as a video tape recorder and a video disk player to be used in such karaoke.

2. Description of the Prior Art

In the karaoke apparatus, the video apparatus is generally used to display both words and pictures for creating the atmosphere.

The music (or audio) signals recorded in the media for karaoke such as video tape and video disk contain, in most cases, the accompaniment and the model vocal.

The model vocal includes a model voice and is used for training a singer.

FIG. 26 shows a conventional karaoke apparatus.

Musical signals and video signals are recorded in a disk 1. If the karaoke apparatus does not include video apparatus, of course, a CD (or analogous medium) on which is recorded music signals is used instead of the disk 1. The disk 1 is driven by an electric motor 2 at a speed of 600 to 1800 rpm. Control means 4 controls the rotation of the motor.

On the disk 1, the frequency-modulated information is recorded in grooves called pits. Signal detecting means 3 reads the information by using, for example, laser. The signal read by the signal detecting means 3 includes video signal and music signal, and both signals are distinguished by the difference in the frequency band.

The video signal is demodulated by a video signal demodulator 5, and the waveform is shaped and noise is removed in a video signal processor 6, and the signal is sent into a video apparatus through an output end 7. This video signal contains the picture suited to the content of the song, and the words displayed in synchronism with the music signal, and the singer sings while reading the words and seeing the picture.

The music signal issued from the signal detecting means 3 is demodulated into a music signal of two channels by a music signal demodulator 8. The demodulated music signal possesses several recording methods. For example, (1) accompaniment signal only, (2) accompaniment signal in L channel, and accompaniment signal+ model vocal signal in R channel, and (3) accompaniment signal in L channel, and model vocal signal in R channel.

The singer's song is converted into a singer's vocal signal by a microphone 10, and is synthesized with a demodulated accompaniment signal in a synthesizer 12 through an amplifier 11. The accompaniment signal and the synthesized singer's vocal signal are processed in a music signal processor 13 to be suited to the apparatus in the next stage, and is issued to an audio appliance or television receiver from output ends 14, 15. The singer's song is heard from a speaker together with the accompaniment.

The singer can practice singing by singing like the model vocal while listening to the model vocal.

However, if the singer does not have excellent hearing ability, he cannot recognize the difference between the model vocal and his own song, and hence cannot sing like the model vocal.

The training apparatus for singing of the present invention measures the characteristics of the model vocal and the singer's song, compares the measured characteristics, and issues the result.

As a result, the singer can objectively recognize the difference between his own song and the model vocal, so that singing lessons can be given effectively and diligently.

SUMMARY OF THE INVENTION

A first exemplary embodiment of the present invention includes a reproduction device for reproducing a music signal recorded on information media, the music signal including a model vocal signal and an accompaniment signal. The invention further includes a model vocal extracting device for extracting the model vocal signal from the music signal, a device for feeding singer's vocal signal into apparatus, a first measuring device for measuring the model vocal characteristic from the model vocal signal, a second measuring device for measuring the singer's vocal characteristic the singer's vocal signal, and an operating device for comparing the singer's vocal characteristic and model vocal characteristic and evaluating the singer's vocal relative to the model vocal. The operating device issues the evaluation by generating a control signal corresponding to the result of comparison.

In this first exemplary embodiment, to transmit the evaluation to the singer, the reproduction device is stopped in action by a control signal from the operating device. As a result, the music is stopped, and the singing time assigned for the singer is over. The greater the difference between the model vocal characteristic and the singer's vocal characteristic, the earlier the operating device generates a control signal, so that a poor singer has a shorter singing time. The singer practices singing with the purpose of singing a longer time.

In a second exemplary embodiment of the present invention, a reproduction device for reproducing a video signal, and video signal controller for varying the video signal are added to the first exemplary embodiment. In the second exemplary embodiment, the smaller the difference between the model vocal characteristic and the singer's vocal characteristic, the earlier the operating device issues a control signal. To transmit the evaluation to the singer, the video signal control device darkens the picture by the control signal from the operating device. Therefore, for a good singer. The words disappear earlier. The good singer is encouraged to improve ability to memorize the words and ability to discern the accompaniment.

In a third exemplary embodiment of the present invention, an on/off device for turning on or off the output signal of the apparatus is added to the first exemplary embodiment. To transmit the evaluation to the singer, in this embodiment, the on/off device turns off the output signal of the apparatus by the control signal from the operating device. As a result, the music is stopped, and the signing time assigned for the singer is terminated similarly as in the first exemplary embodiment.

In the third exemplary embodiment, if the difference between the model vocal characteristic and the singer's vocal characteristic is larger than a specified allowable value, it is judged that the model vocal characteristic and singer's vocal characteristic are different.

In a fourth exemplary embodiment of the present invention, a level setting device for varying the allowable value is provided.

In fifth and sixth exemplary embodiments of the present invention, a reproduction device for reproducing a video signal, a signal generating device for determining a display signal depending on the result of comparison between the model vocal characteristic and singer's vocal characteristic, and a signal superposing device for superposing the display signal on the video signal are added to the first exemplary embodiment.

A seventh exemplary embodiment of the present invention includes means for preventing comparison between the model vocal characteristic and singer's vocal characteristic from being conducted prior to extraction of model vocal signal.

In an eighth exemplary embodiment of the present invention, a memory for storing the result of the comparison between the model vocal characteristic and singer's vocal characteristic is added to the fifth exemplary embodiment.

DETAILED DESCRIPTION OF THE INVENTION

1st Exemplary Embodiment

Figure 1:
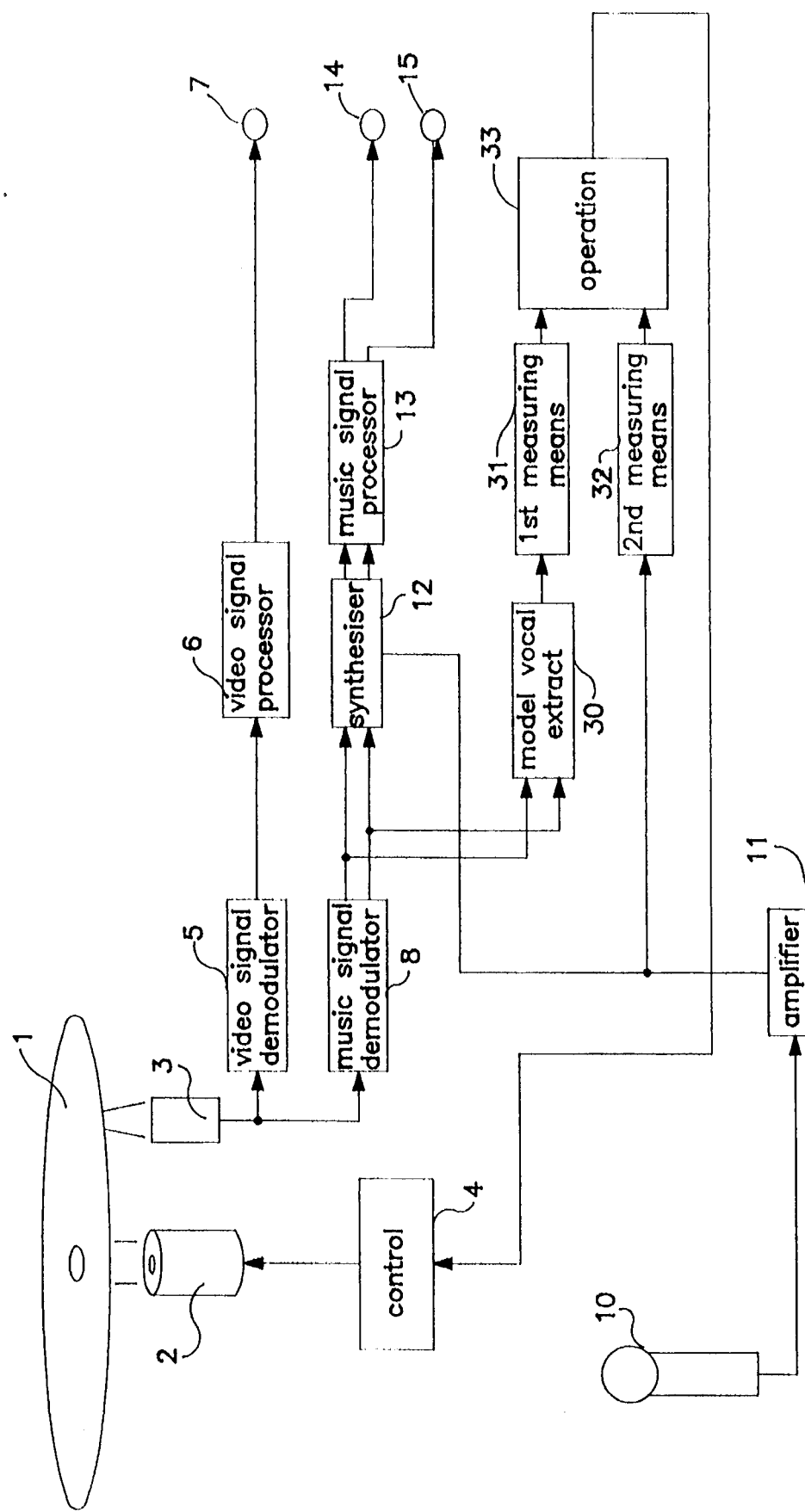
FIG. 1 is a block diagram showing a first exemplary embodiment of the present invention.

FIG. 1 shows a first exemplary embodiment of the invention.

In a disk 1, both video signals and music signals are recorded in FM. Moreover, digital music signals in CD format may be also recorded. In this embodiment, for the sake of simplicity, the case of using FM music signals is explained. In most cases, the FM music signal possesses the accompaniment signal in L channel, and the accompaniment signal+ model vocal signal in R channel. The singer, if unexperienced, can select the R channel to listen to the model vocal, so he can understand and practice singing.

The disk 1 is driven by an electric motor 2 controlled by control means 4, at 600 rpm to 1800 rpm, if the linear speed of the disk is constant. When the electric motor 2 is normally driven, an RF signal including video signal and music signal is issued from signal detecting means 3. The video signal is demodulated in a video signal demodulator 5 and is sent into a video signal processor 6 to undergo waveform shaping and noise removal, and is issued into a television receiver through an output end 7. The music signal is demodulated into a two-channel music signal in music signal demodulator 8.

The song of the singer is converted into a singer's vocal signal in a microphone 10, and is passed through an amplifier 11 and is synthesized with the demodulated accompaniment signal in a synthesizer 12. The singer's vocal signal synthesized with the accompaniment signal is processed in a music signal processor 13 so as to be suited to the apparatus in the next stage, and is issued to an audio apparatus or television receiver through output ends 14, 15. The song of the singer is heard from a speaker together with the accompaniment.

In the present invention, in order to evaluate the voice of the singer objectively, the model vocal and the singer's vocal are compared as explained below.

Model vocal extracting means 30 extracts the model vocal signal in R channel, among the music signals demodulated by the music signal demodulator 8.

This extraction is performed in the (R-L) operation because the accompaniment in L channel and accompaniment in R channel are nearly equal to each other in a karaoke disk.

Figure 2:
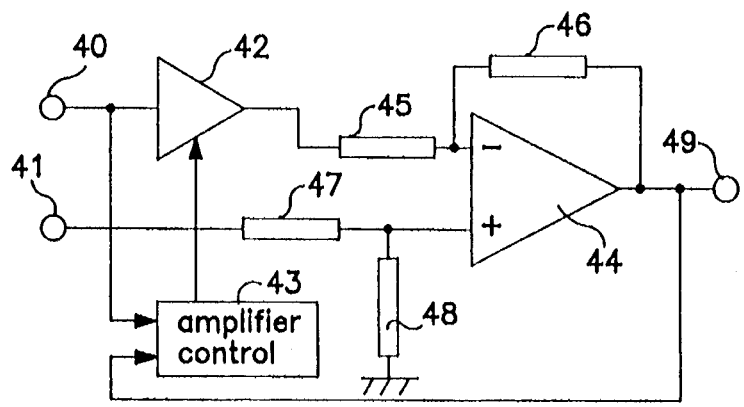
FIG. 2 is a block diagram showing an exemplary model vocal extracting means.

FIG. 2 shows a circuit of an exemplary model vocal extracting means 30.

A L channel music signal is fed into an input end 40, and passes through an amplifier 42, and is fed into one end of a resistance 45. The signal output from resistance 45 is L' signal. At an input end 41, an R channel music signal is fed, and is put into one end of a resistance 47. The signal output from resistance 47 is R signal. When resistances 45 through 48 are all in equal values, an operational amplifier 44 serves as a differential amplifier for calculating the difference of input signals, so that a signal (R-L') is obtained at an output end 49.

If the music signal does not contain model vocal signal, both R signal and L' signal are same accompaniment signals, and a 0 signal should be obtained at the output end 49. Amplifier control means 43 controls the amplifier 42 so that the signal of the output end 49 may be 0 in the introductory part not containing vocal, and sets and fixes the amplitude of the L' signal. Accordingly, if the music signal contains the model vocal signal, only the model vocal signal excluding the accompaniment signal can be extracted. Karaoke tunes recorded in the media are separated by divisions called chapters, and in this embodiment, the amplitude setting of the L' signal is done at the beginning of a chapter, and the model vocal signal is extracted in every tune.

In this embodiment, the accompaniment signal is recorded in L channel, and accompaniment signal+model vocal signal in R channel, but when the accompaniment signal is recorded in L channel and model vocal signal in R channel, in the case of CD or the like, of course, the model vocal signal is obtained only by selecting the R channel.

Referring back to FIG. 1, the extracted model vocal signal is measured by first measuring means 31, and the singer's vocal signal by second measuring means 32, and the tune, amplitude, rhythm and other vocal characteristics are measured.

The vocal characteristics show the basic characteristics of vocal signal, removing individual features such as male and female voice difference. Accordingly, comparison between model vocal signal and singer's vocal signal is effected correctly by comparing both vocal characteristics.

Figure 3:
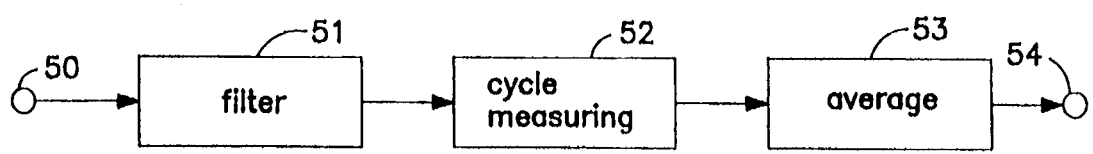
FIG. 3 is a block diagram showing an example of measuring means for measuring the vocal characteristic.

FIG. 3 shows an exemplary tune measuring means in the measuring circuits 31, 32. The tune is measured by the voice frequency, or by the period which is an inverse of frequency.

The vocal signal is fed from an input end 50, and the frequency band is limited by a filter 51 between, for example, 50 Hz and 800 Hz. This is because the vocal signal is most often present in this band. Accordingly, the accompaniment signal that cannot be removed, being contained in the output of the model vocal extracting means 30 can be removed. Furthermore, the fundamental wave component of vocal signal becomes large, and a more accurate vocal characteristic can be obtained. Cycle measuring means 52 measures the cycle of the vocal signal having a larger fundamental wave component by band limiting, that is, the tune, by the number of reference clocks counted during zero crossing.

Zero crossing is defined by the time of the digitized vocal signal crossing the specified value. As a result, the cycle time of vocal signal is obtained in every cycle.

The cycle time is averaged and issued in every specified time interval by average means 53. The specified time interval is preferred to be within 2 seconds because the tune change mostly occurs in the duration of an eighth note or a quarter note.

Figure 4:
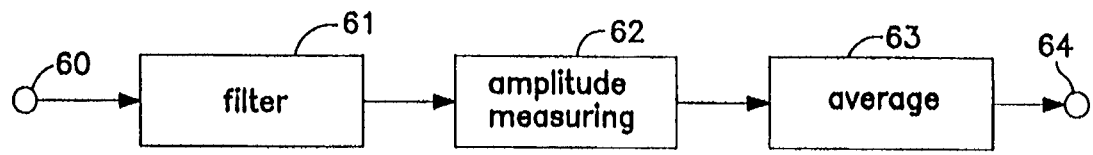
FIG. 4 is a block diagram showing another example of measuring means for measuring vocal characteristic.

The averaged cycle time is obtained by dividing the sum of the cycle time obtained in the specified time interval by the number of sets of data. However, to enhance the reliability of the averaged cycle time, if the number of sets of data is less than a specific value, the average means 53 does not issue averaged cycle time. The tune change of a song rarely occurs in a short time, and it is practical to represent the tune by the averaged cycle time. FIG. 4 shows amplitude measuring means in the measuring circuits 31, 32. The vocal signal passes through a filter 61, and the amplitude is measured in the amplitude measuring means 62 by diode detection or digital technique. The measured amplitude data is averaged in the average means 63 in every specified time interval, same as the tune.

Figure 5:
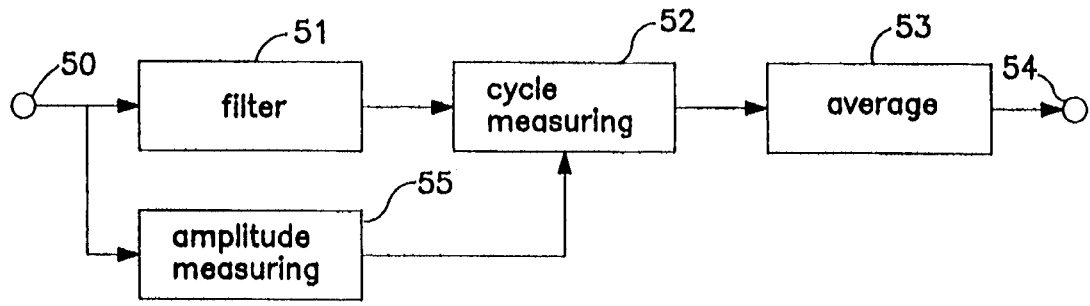
FIG. 5 is a block diagram showing another example of measuring means for measuring vocal characteristic.

The circuit in FIG. 5 comprises both tune measuring means and amplitude measuring means. The amplitude measuring means 55 stops the action of the cycle measuring means when the amplitude of the input vocal signal is less than a specific level, so that the tune measuring means may not issue the result of measurement. This is intended to prevent erroneous action of measuring the tune, taking the noise for vocal signal, in the remaining portion without vocal signal.

Thus, the measuring means 31, 32 measure the tune and amplitude, and also measures the rhythm, if necessary.

Returning to FIG. 1, the first measuring means 31 measures the model vocal signal, and issues a model vocal characteristic.

The second measuring means 32, similar to the first measuring means 31, measures the singer's vocal signal, and issues a singer's vocal characteristic. The operating means 33 compares the model vocal characteristic and singer's vocal characteristic, and operates the result of comparison by specified method, and evaluates the singer's vocal relative to the model vocal on the basis of the result of operation. The comparison is effected with respect to, for example, the tune, amplitude and rhythm. For the simplicity of explanation, hereinafter, only the comparison of tune is explained in the following embodiments.

The operating means 33 calculates the difference of averaged cycle time issued at every specified time interval by both measuring means 31, 32, that is, the difference in tune between the model vocal characteristic and the singer's vocal characteristic. If the difference is larger than a predetermined allowance, it is judged that the both vocal characteristics are different. That is, a tune error is judged. If the error is within the allowance, then both vocal characteristics are judged to be same. That is, a correct tune is judged. For example, a tune difference of an octave may be judged to be a correct tune.

The operating means 33 judges, for example, in the case of a predetermined allowance of 30 Hz, when the first measuring means 31 measures 100 Hz and the second measuring means 32 measures 135 Hz, a tune error is judged because the difference of the two vocal characteristics is 35 Hz, (which is larger than the allowance of 30 Hz). If the result of the second measuring means 32 is 120 Hz, the difference of the two vocal characteristics is 20 Hz, which is smaller than 30 Hz (the predetermined allowance), so that a correct tune is judged. If there is measuring error by measuring means, it is absorbed within the allowance, and hence it can be ignored.

It should be noted that further averaging of the difference of the averaged cycle time of the model vocal characteristic and singer's vocal characteristic is effective for removing the noise effects.

In the portion free from voice such as the introduction, intermission and breath, both vocal characteristics cannot be compared. Therefore when the amplitude of the model vocal signal is below a specific level and the first measuring means 31 does not measure the model vocal characteristic, a circuit composition for stopping the operation of the operating means 33 is practical.

However, while the first measuring means 31 is issuing a model vocal characteristic, if the second measuring means 32 does not issue singer's vocal characteristic, it means that the singer is not singing while he is supposed to sing, which is judged as a tune error.

As an example of a method of evaluating the singer's vocal relatively to the model vocal, the embodiment shows the following.

That is, in this embodiment, the operating means 33 evaluates the singer's vocal in comparison with the model vocal, by the number of tune errors or by the difference between wrong tunes and correct tunes.

For instance, the operating means 33 sets the initial value N at the beginning of a song in every song, and subtracts a specified value n for every tune error. Or, subtracting n for every tune error, however, n is added for every correct tune. When the degree of tune error is large, or if the singer's vocal characteristic is not issued while the model vocal characteristic is issued, it is a greater failure than an ordinary tune error, and hence it is rational to subtract a greater value than n.

Continuing, when the initial value N reaches a specified value M, the operating means 33 completes the operation, and sends a control signal corresponding to the result of comparison of the singer's vocal characteristic and model vocal characteristic to the control means 4, so that the evaluation of the singer's vocal relative to the model vocal is issued.

That is to say, in every specified time interval, the operating means 33 compares the model vocal characteristic and the singer's vocal characteristic, and adds or subtracts the value determined with respect to the result of comparison to or from the initial value N, and the operating means 33 completes this operation when the initial value N reaches the specified value M, and generates a control signal.

As an example of a method of transmitting the evaluation to the singer, in this embodiment, the reproduction means changes the operation of the electric motor 2 by the control signal.

That is, using the control signal from the operating means 33, the control means 4 stops the rotation of the electric motor 2, or pauses or prohibits the rotation of the electric motor 2 to allow the signal detecting means 3 to advance directly into the next track, thereby stopping the reproduction from the disk 1.

As a result, the music stops, and the singing time assigned to the singer is terminated.

A singer making fewer tune errors is granted a longer singing time.

For a singer making many tune errors, the accompaniment stops earlier, and a shorter singing time is permitted.

The skill of the singer is objectively evaluated by the duration of the singing time. The singer, singing with a feel of tension expecting to sing the whole notes of the music, can exercise singing effectively.

In this embodiment, a disk was used as the media for recording the video and audio signals, but the embodiment can also be realized by CD, video tape recorder or the like.

2nd Exemplary Embodiment

Figure 6:
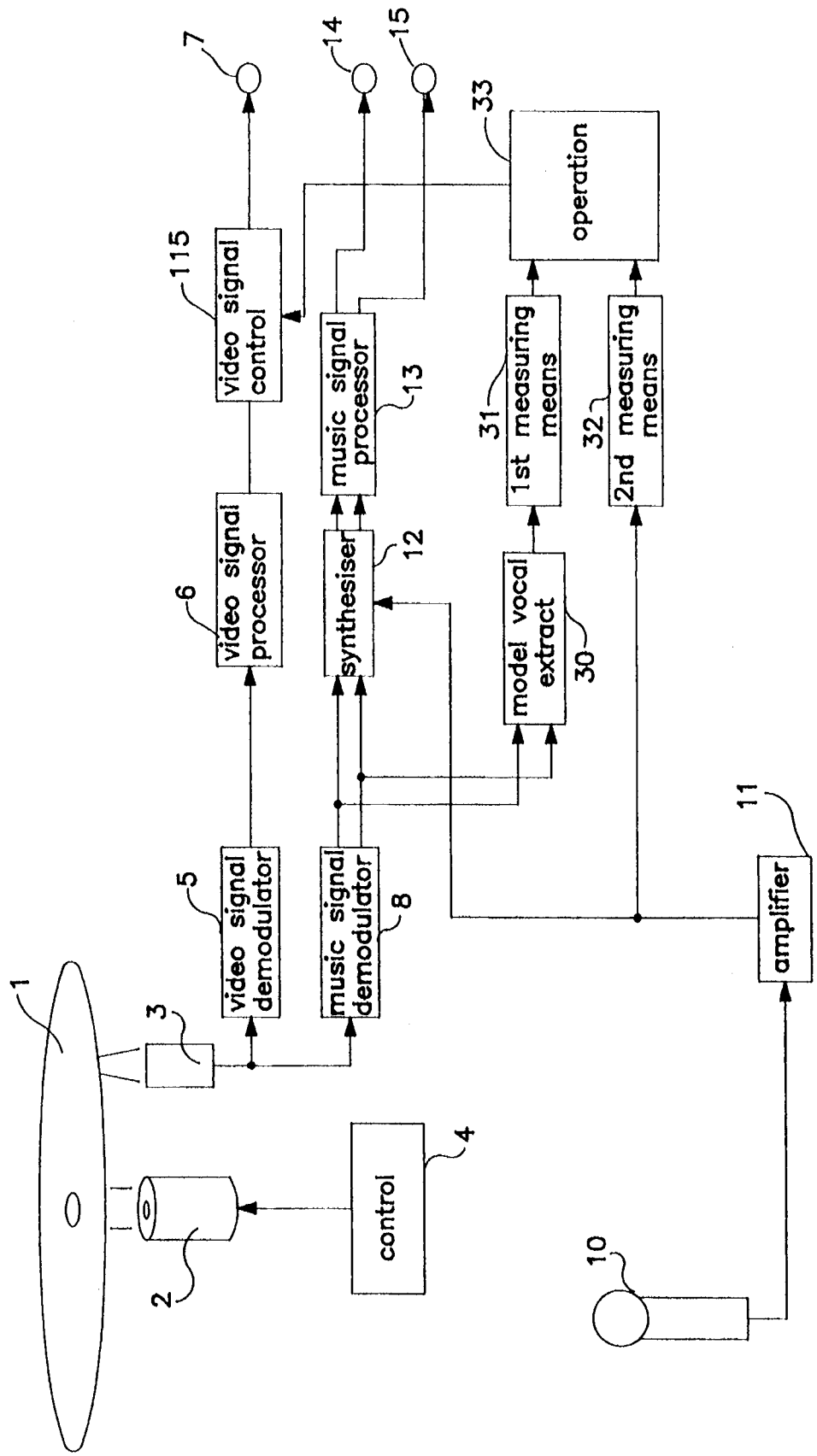
FIG. 6 is a block diagram showing second exemplary embodiment of the present invention.

FIG. 6 shows a second embodiment of the invention. The members explained in the first embodiment are identified with same reference numerals, and their explanations are omitted herein.

Operating means 33, as in the first embodiment, judges tune errors or correct tunes.

As an example of method of evaluating the singer's vocal relative to the model vocal, the embodiment shows the following.

In this embodiment, specifically, the operating means 33 evaluates the singer's vocal in comparison with the model vocal, by the number of correct tunes, or by the difference between correct tunes and wrong tunes.

For example, the operating means 33 sets the initial value N at the beginning of every music, and adds n for every correct tune. Or adding n for every correct tune, however, n is subtracted for every wrong tune.

When the initial value N reaches a specified value M, the operation is stopped, and a control signal is sent to video signal control means 115, thereby issuing the evaluation of the singer's vocal in comparison with the model vocal.

As an example of transmitting the evaluation of the singer, the following method is shown in the embodiment.

That is, the better the singer sings, the earlier the control signal is sent to the video signal control means 115.

Figure 7:
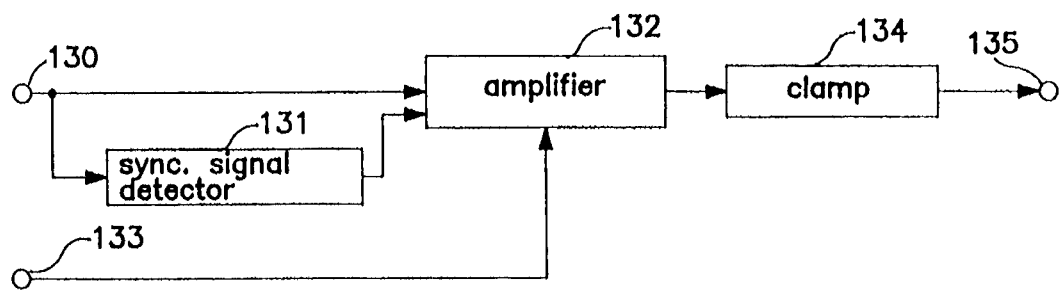
FIG. 7 is a block diagram showing an example of a display control means.

FIG. 7 shows the configuration of the video signal control means 115. A synchronous signal detector 131 removes the synchronous signal from the video signal fed into a terminal 130. The video signal being rid of the synchronous signal passes through an amplifier 132, and is given a DC voltage in a clamp circuit 134, and is issued from a terminal 135 to a television receiver. The amplifier 132 is controlled of the degree of amplification by the control signal from comparative operating means 33 fed into a terminal 133. In this embodiment, this control signal decreases the degree of amplification of the amplifier 132 and reduces the amplitude of the video signal. As a result, the picture becomes dark and the words are not visible.

The words are usually indicated by the change of display color progressing in coincidence with the progress of the accompaniment, so that the playing point of the accompaniment is visibly shown to the singer. The singer, if not hearing the accompaniment, can sing to the accompaniment by singing to the change of the display color of words.

In this embodiment, since the words are erased, fit is necessary to listen to the accompaniment carefully to sing to the accompaniment.

The singer, if the words are not visible, sings with attention to the accompaniment with the words in memory. If singing successfully, the singer will have a great sense of satisfaction, so that the singing drill according to this embodiment is effective for achievement of singing.

Figure 8:
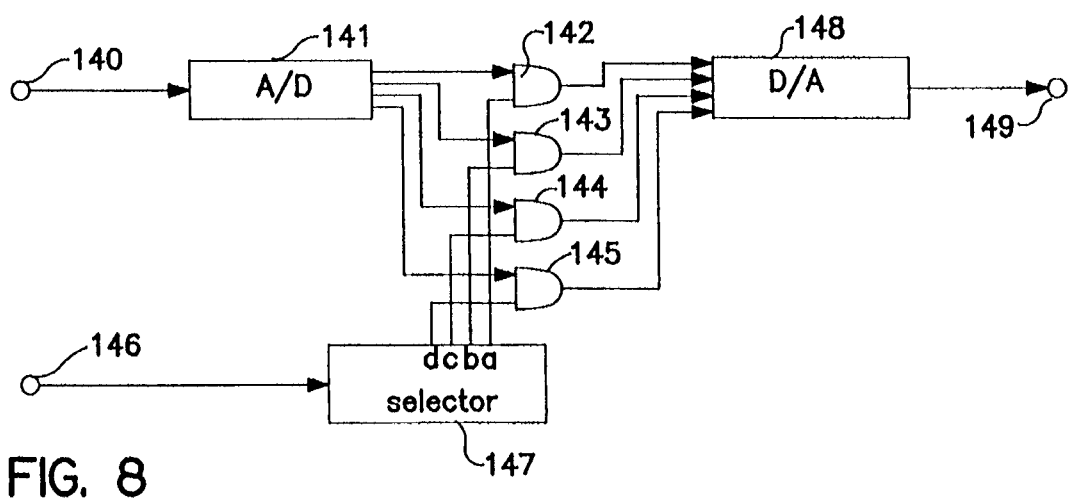
FIG. 8 is a block diagram showing an example of another display control means.

As the video signal control means 115, the circuit shown in FIG. 8 may be also used. The circuit in FIG. 8 can remove at least part of the information of video signal. That is, when a control signal is fed from a terminal 146, a selector 147 sends a signal to AND circuits 142 to 145. For example, if the LSB of the A/D converted signal is fed into the AND circuit 142, signals are sent so that "a" may be logic low state and that "b", "c", "d" may be logic high state. As a result, the AND circuit 142 is turned off, and the video signal is rid only of the LSB. For example, the video signal minus words is D/A converted, and issued from 149.

3rd Exemplary Embodiment

Figure 9:
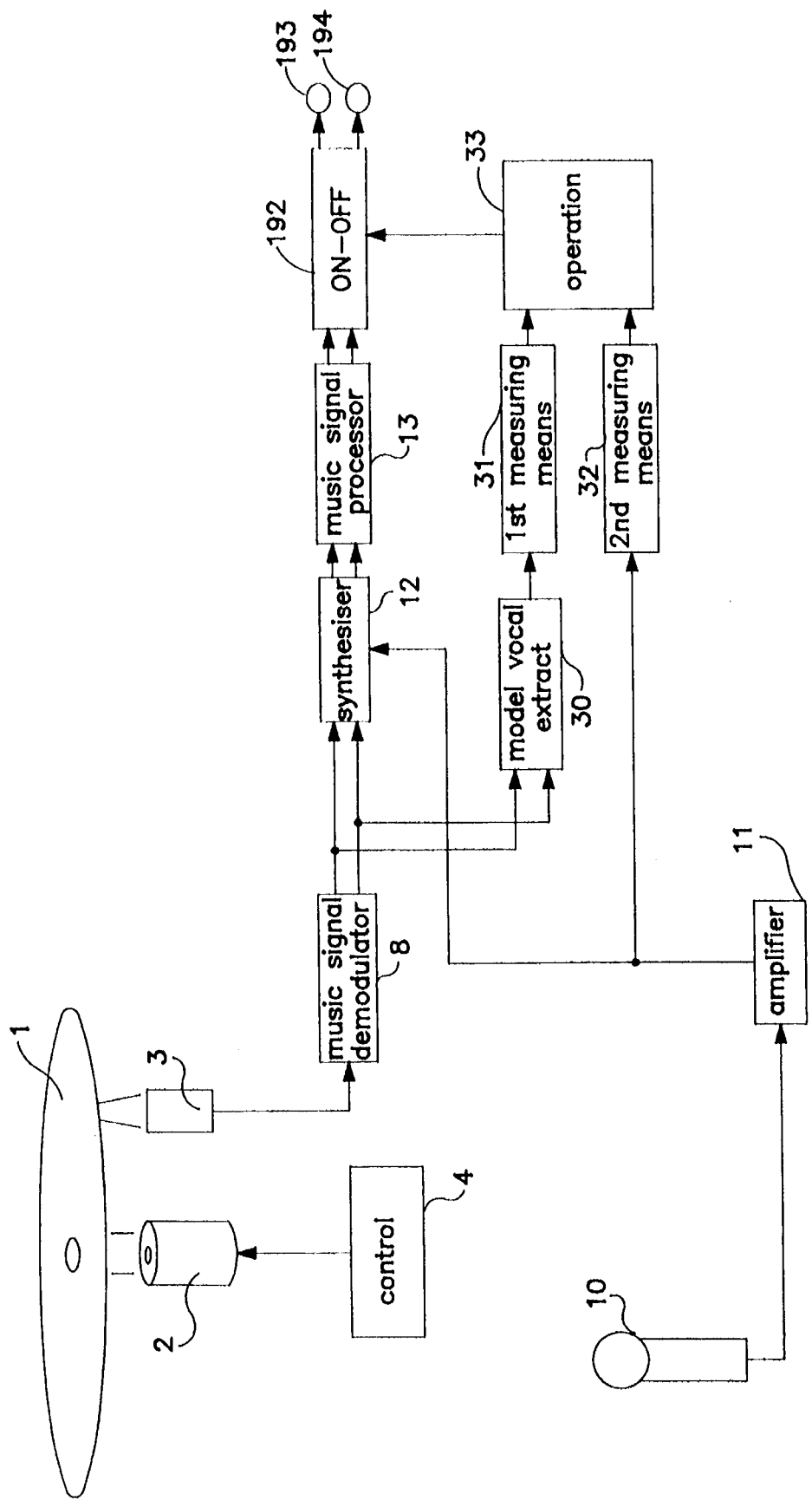
FIG. 9 is a block diagram showing a third exemplary embodiment of the present invention.

FIG. 9 shows a third exemplary embodiment of the invention, and a video signal is not included in this embodiment.

An electric motor 2 controlled by control means 4 rotates a CD disk 1. Signal detecting means 3 optically detects the signal on the disk, and a music signal modulator 8 demodulates the detected digital data as two-channel analog music signal.

The music signal is fed into model vocal extracting means 30 and synthesizer 12.

When the accompaniment signal is recorded in L channel of CD disk 1 and the model vocal signal in R channel, the model vocal extracting means 30 can extract the model vocal signal by selecting the R channel.

When the accompaniment signal is recorded in L channel of CD disk 1 and the accompaniment signal+model vocal signal in R channel, the model vocal extracting means 30 extracts the model vocal signal in the method explained in the first embodiment.

The extracted model vocal signal is fed into first measuring means 31, and the tune, amplitude, rhythm and other vocal characteristics are measured.

The singer's vocal is fed from a microphone 10, and is entered into second measuring means 32 and synthesizer 12 through an amplifier 11.

The singer's vocal signal fed into the synthesizer 12 is issued through on/off means 192 together with the accompaniment signal.

The operating means 33, same as in the first embodiment, compares the singer's vocal characteristic and the model vocal characteristic, operates the result of comparison by a specified method, and evaluates the singer's vocal in comparison with the model vocal on the basis of the result of operation.

As an example of a method of evaluating the singer's vocal relative to the model vocal, the embodiment shows the following. That is, the operating means 33 sets the initial value N at the beginning of music in every music, and subtracts n upon every tune error. Or, n is subtracted upon every tune error and n is added upon every correct tune.

When the initial value N reaches a specified value M, the operation is terminated, and a control signal is sent to on/off means 192, thereby issuing the evaluation of the singer's vocal relative to the model vocal.

As an example of method of transmitting the evaluation to the singer, the following method is shown in the embodiment.

The on/off means 192 receiving a control signal from the operating means 33 immediately turns off the output signal including the accompaniment signal and the singer's vocal signal.

As a result, the singing time for the singer is terminated. A singer making fewer tune errors is granted a longer singing time. A singer making many tune errors is given a shorter singing time.

The skill of the singer is evaluated by the duration of the singing time. The singer sings with a feeling of tension, expecting to sing the whole song, so that a favorable effect is expected.

4th Exemplary Embodiment

In a fourth exemplary embodiment, a function capable of freely varying the allowance when comparing the model vocal characteristic and singer's vocal characteristic is added to the foregoing embodiments.

Figure 10:
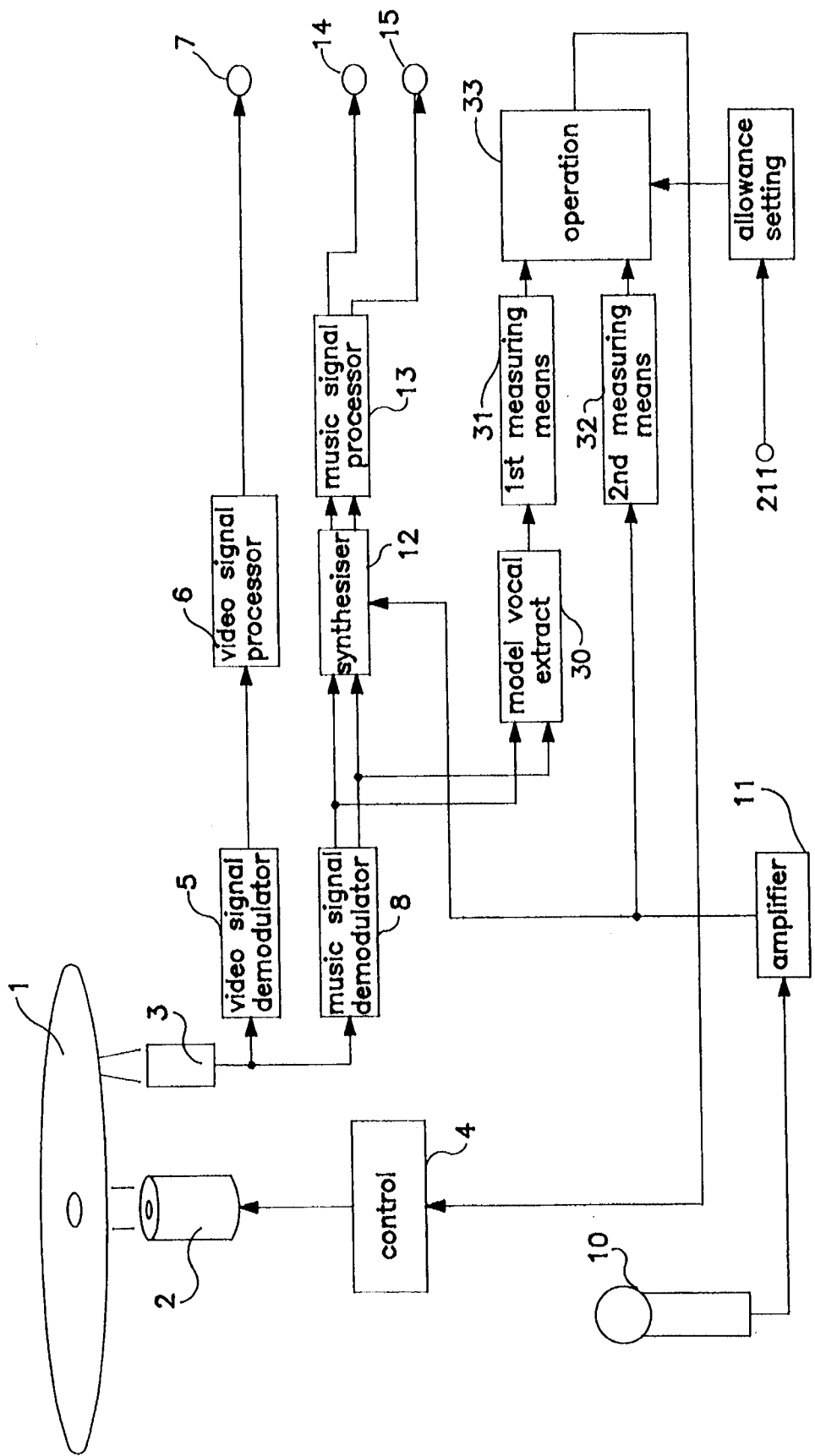
FIG. 10 is a block diagram showing a fourth exemplary embodiment of the present invention.

FIG. 10 shows the fourth embodiment of the invention.

The operating means 33, like the first embodiment, compares the model vocal characteristic and singer's vocal characteristic, operates the result of comparison in specified method, and evaluates the singer's vocal in comparison with the model vocal on the basis of the operation. By completing this operation and generating a control signal, the evaluation of the singer's vocal relative to the model vocal is issued.

The control means 4, upon receiving a control signal from the operating means 33, stops an electric motor, for example, as in the first embodiment. A singer making many tune errors can only sing for a short time.

The operating means 33, similarly as in the first embodiment, judges a wrong tune when the difference between the model vocal characteristic and singer's vocal characteristic is larger than the allowance. This allowance is set by allowance setting means 212 according to the command entered from a terminal 211.

The allowance can be set depending on the singing ability of the singer or the difficulty of the music, and hence the invention is applicable to all singers from high level to low level.

In FIG. 10, the control means 4 controls the electric motor, but the same effect can be obtained by controlling the video signal or audio signal.

5th Exemplary Embodiment

Figure 11:
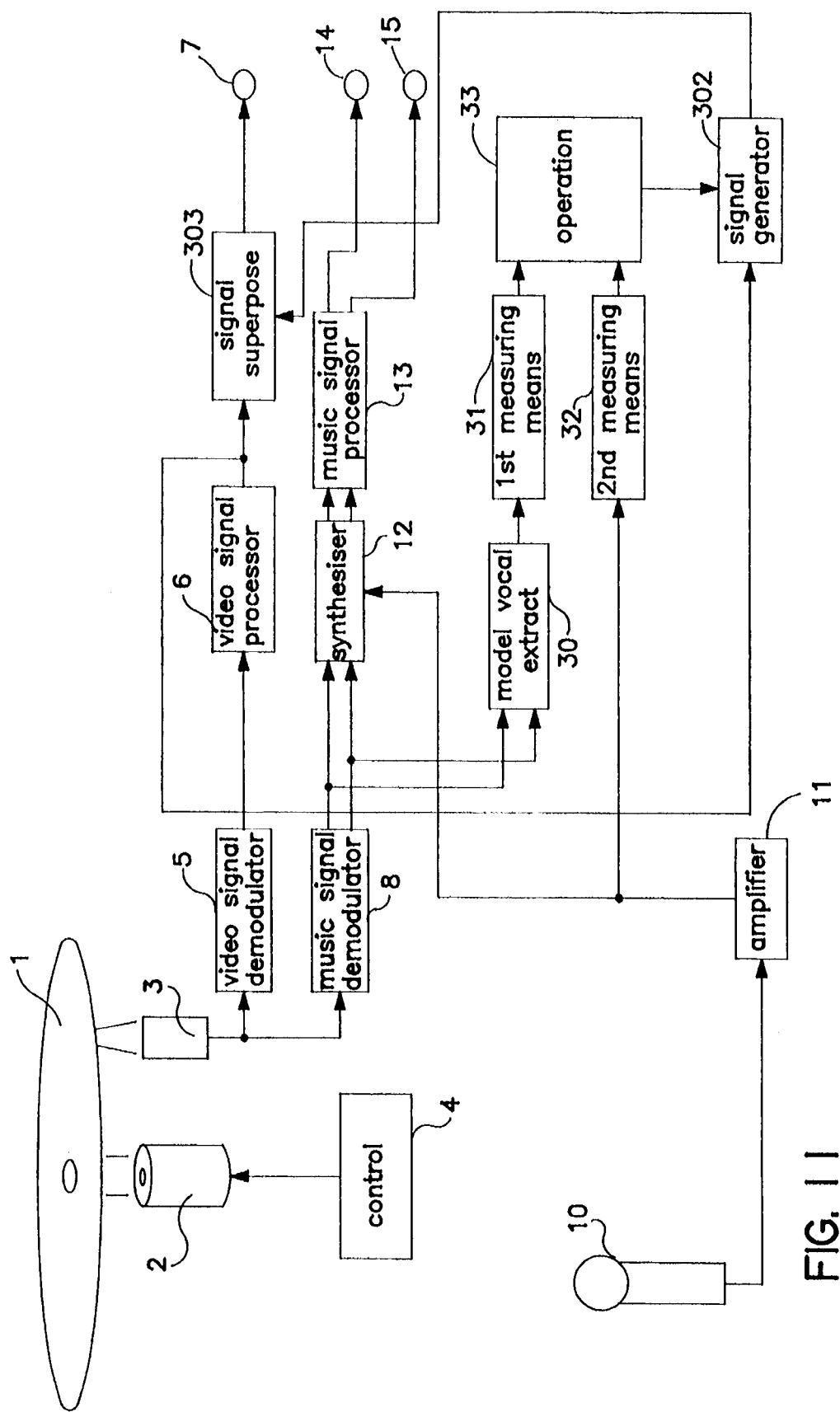
FIG. 11 is a block diagram showing a fifth exemplary embodiment of the present invention.

FIG. 11 shows a fifth exemplary embodiment of the invention.

In this embodiment, the video signal showing the result of comparison of the model vocal characteristic and singer's vocal characteristic is displayed by superposing on the video signal. In the constitution shown in FIG. 11, a signal generator 302 and signal superposing means 303 are added to the first embodiment.

Operating means 33 compares the tune data of the model vocal characteristic and singer's vocal characteristic.

The tune of a song is not so drastic as to change, for example, in every 100 msec, but the same tune generally continues for about several hundred milliseconds. Therefore, in this embodiment, the operating means 33 compares the tune data in every 500 msec, and issues the result of comparison, and the result is easy to understand for the singer. The comparison result issued by the operating means 33 is fed into the signal generator 302.

Figure 12:
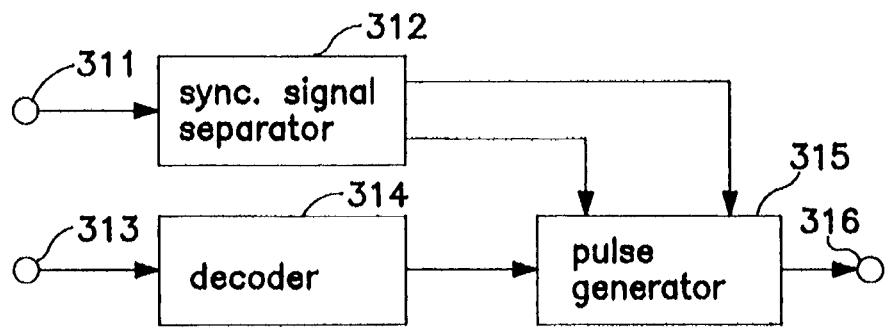
FIG. 12 is a block diagram showing an example of a signal generating means.

FIG. 12 shows an example of the signal generator 302. A decoder 314 determines the position of the display pattern, its color and others and sends out, depending on the comparison result entered from an input end 313, other control data. This display pattern is issued from an output end 316 through a pulse generating means 315, and is superposed on the video signal in the signal superposing means 303 (FIG. 11). The display pattern is held until the operating means 33 issues next control data.

A synchronous signal separator 312 extracts vertical and horizontal synchronous signals from the video signal entered from the input end 311.

A pulse generator 315 issues a pulse on each horizontal scanning line for determining the shape of the display pattern and position on the display pattern screen.

The pulse generator 315 also occasionally issues the color signal of the display pattern.

Figure 13:
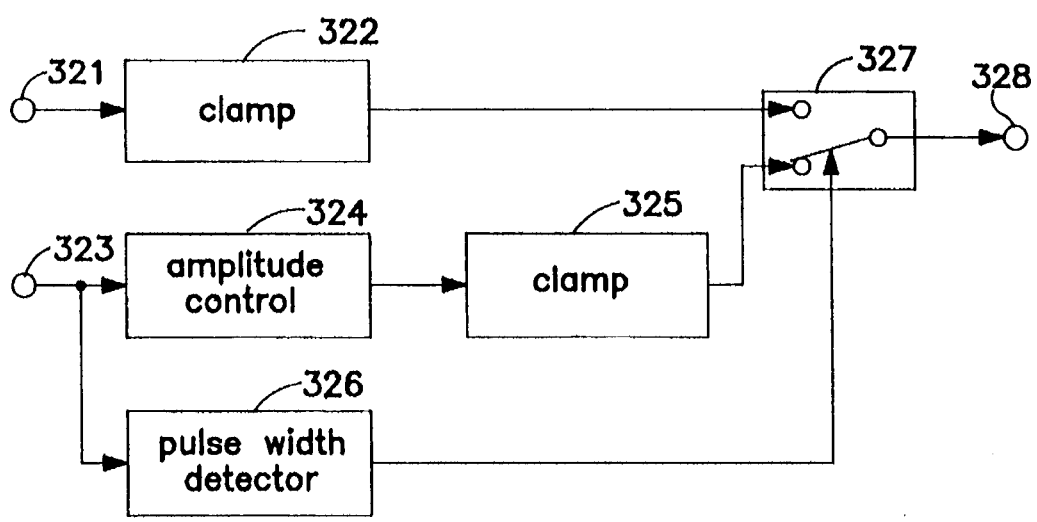
FIG. 13 is a block diagram showing an example of a signal superposing means.

FIG. 13 shows an example of the signal superposing means 303. The video signal is entered from an input end 321, and is clamped in a clamp circuit 322. The clamping method is preferred to a pedestal clamp so as not to be influenced by fluctuations of bias voltage in a switching circuit 327.

The display pattern signal generated in the signal generator 302 is entered also from an input end 323, and the amplitude is adjusted in an amplitude adjusting circuit 324 so as to be matched in amplitude with the video signal. If the amplitude is adjusted to correspond to, for example, 100 IRE of the video signal, the display pattern becomes white level which is easily recognized.

The display pattern signal adjusted in amplitude is clamped to the same potential as the pedestal level of the video signal in a clamp circuit 325. On the other hand, a pulse width detecting circuit 326 detects the pulse width of display pattern pulse, and generates a switch signal. A switch circuit 327 sends out the output of the clamp circuit 322 or the output of the clamp circuit 325 to an output end 328.

Thus explained signal generator 302 and signal superposing means 303 may be easily constituted by using an LSI circuit, for example, μPD6455 of NEC.

Figure 14:
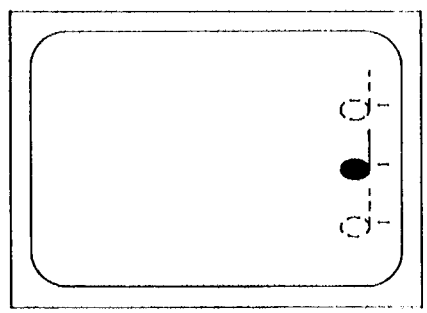
FIG. 14 is a diagram showing an example of a first screen display in the fifth embodiment.
Figure 15:
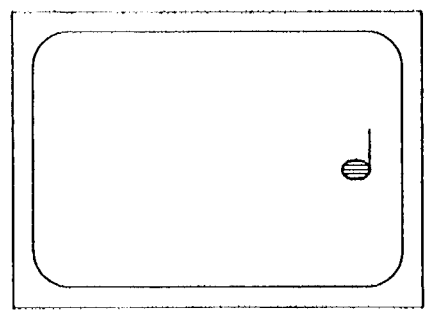
FIG. 15 is a diagram showing an example of a second screen display in the fifth embodiment.

Examples of screen displays created by the signal generator 302 are shown in FIGS. 14 and 15. In FIG. 14, a wrong tune is indicated by a note. The note is placed at position c if the tune is correct (the tune error is within the allowance), and indicated at position a in the case of a higher pitched tune error, or position b in the case of a lower pitched tune error. Since the direction of the tune error and note position coincide, the singer can easily recognize the direction of the tune error.

When changing the position of a note, if moving smoothly by steps toward the target position, the singer can more easily recognize the tune error, and it can be realized by dividing the total position changing extent in each frame of video signal.

In FIG. 15, the note color is green if the tune is correct, red if higher in pitch, and blue if lower in pitch. The note color is determined by the decoder 314 in FIG. 12 according to the result of comparison issued by comparison operating means 301.

When changing the note color, if the hue is changed in steps toward the target color, the singer can more easily recognize the direction of tune error.

The stepwise change of hue is realized by causing hue changes of three degrees by, for example, color vector in every, say, two frames.

In color representation of tune error, the display position is not changed, and the space occupied by the notes on the screen is small, and the vision of the singer for reading the display can be fixed.

FIG. 14 and FIG. 15 show the judgement whether the tune is higher or lower. However, the signal superposing means 303 can display the tune error, depending on its degree, in plural steps.

Thus, by displaying the tune of the singer by picture, and expressing the tune error by the display position or color of the picture, the singer can clearly recognize the difference between the model vocal and his own vocal on the monitor screen.

6th Exemplary Embodiment

The sixth exemplary embodiment of the invention is shown in FIG. 11 similarly as the fifth embodiment. However, the difference between the model vocal characteristic and singer's vocal characteristic is expressed by the area of a graphical pattern.

Operating means 33, similarly as in the first embodiment, compares the model vocal characteristic and singer's vocal characteristic, and judges a tune error.

In the operating means 33, the initial value N is set, n is subtracted by every tune error, and a control signal corresponding to the remaining value is sent to a signal generator 302.

The signal generator 302 sends a display signal corresponding to the transmitted control signal and other control data, for example, a signal for displaying a rectangle having an area proportional to the control signal, to signal superposing means 303. The display signal is superposed on the video signal by the signal superposing means 303, and the two signals are simultaneously displayed on the screen.

An example signal generator 302 is shown in FIG. 12. A control signal is entered from an input end 313, and a decoder 314 generates a counter value proportional to the control signal, and sends to a pulse generator 315. The pulse generator 315 issues a signal which becomes logic high state in the period corresponding to the output of the decoder 314.

Figure 16:
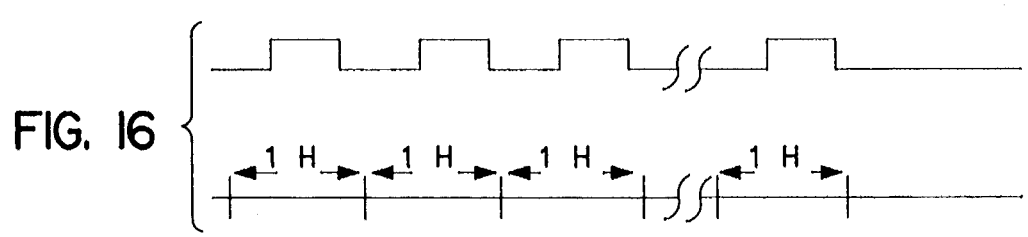
FIG. 16 is a diagram showing signals in a sixth exemplary embodiment.

For example, if the control signal is N, which is the same as the initial value, that is, if there is no tune error, a pulse signal of which H is 25 μsec is issued, and at every tune error, H is subtracted by 0.5 μsec each. As a result, a signal expressing a rectangle having an area proportional to the control signal is generated. This display signal is the wave form shown in FIG. 16, and a slender rectangle 332 is displayed on a screen 331 of a television receiver shown in FIG. 17.

If the width of the rectangle in the vertical direction is about 12 to 20 horizontal scanning lines, it is enough for the singer to recognize. The position of the rectangle can be freely set by selecting the synchronous signal.

An IC, for example, an NEC-made μPD6455 incorporates the synchronous signal separator 312, decoder 314 and pulse generator 315 in FIG. 12, and arbitrary letter or character display, display area and position can be easily changed.

An example of a signal superposing means 303 is shown in FIG. 13. The rectangular wave pulse from the signal generator 302 is fed from the input end 323, and the amplitude is adjusted so as to be equivalent to 100 IRE of video signal in the amplitude adjusting circuit 324. For example, if the amplitude of the video signal is 2 V, the amplitude of the rectangular wave is adjusted to 1.4 V.

As a result, the rectangular wave signal becomes a signal equivalent to white 100% of the video signal, and is clamped at the same potential as the pedestal of the video signal in the clamp circuit 325, and is fed into the switch circuit 327.

Figure 17:
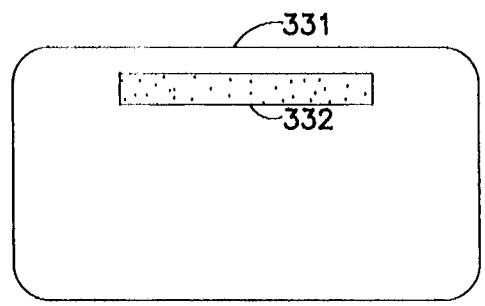
FIG. 17 is a diagram showing the display in the sixth embodiment.

The pulse width detecting circuit 326, detecting the input of the rectangular wave signal, changes over the switch circuit 327 to the side for passing the rectangular wave signal. Consequently, the rectangular wave signal is superposed on the video signal. This rectangular wave signal and the rectangular form 332 in FIG. 17 are white signals that can be recognized easily by the singer.

The operating means 33 subtracts n from the initial value N every time a tune error is detected, and sends a control signal corresponding to the remaining value to the signal generator 302. The control signal is recognized by the singer as a change in the area of the graphic pattern displayed on the screen of the television receiver.

The area of the displayed graphic pattern changes upon every tune error, and the singer immediately knows his tune error. The area of the displayed pattern is the cumulative result of the hitherto tune errors, so that the singer can visually know the number of tune errors from the beginning.

The graphic area display of the tune errors is, as compared with numerical display, easily recognized intuitively, while the psychological pressure is smaller.

In this embodiment, the graphic area decreases after every tune error, and the duration of singing time until the graphic area becomes zero is the evaluation of the skill of the singer.

7th Exemplary Embodiment

Figure 18:
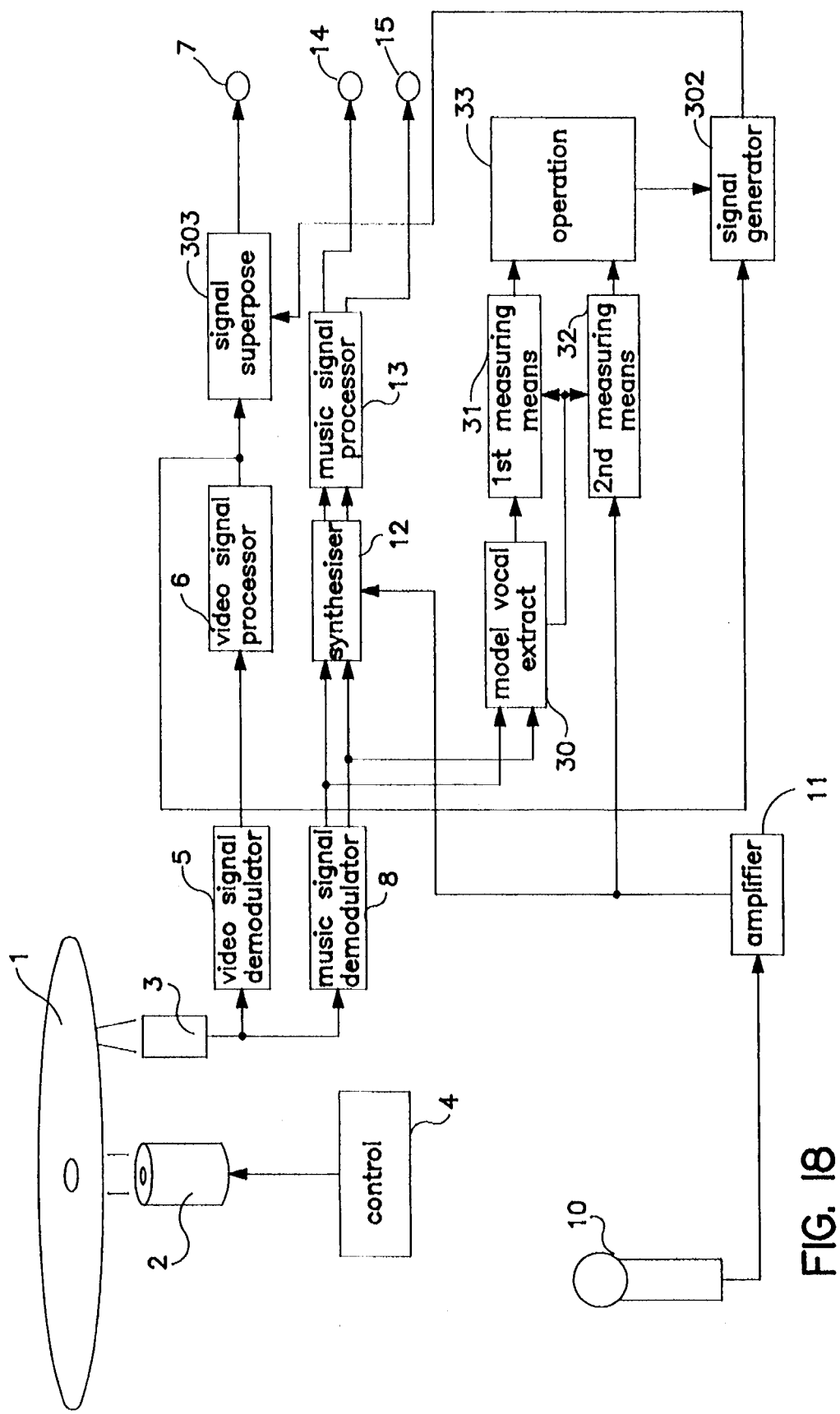
FIG. 18 is a block diagram showing a seventh exemplary embodiment of the present invention.

FIG. 18 shows a seventh exemplary embodiment of the invention. In this embodiment, in contrast with the embodiment shown in FIG. 11, the information relating to the model vocal extraction is issued from a model vocal extracting means, and is fed into first measuring means 31 and second measuring means 32.

Hence, the apparatus is prevented from executing a comparison between the model vocal characteristic and singer's vocal characteristic due to mistake before the existence of the model vocal signal.

As in the fifth embodiment of the invention, the picture to be generated by the signal generator 302 is determined by the result of a comparative operation between the model vocal characteristic and singer's vocal characteristic.

For example, in a laser disk, the accompaniment and model vocal are recorded in the R channel, and the accompaniment is recorded in the L channel. The model vocal can be picked up by feeding the signals of both channels in the model vocal extracting means 401, and erasing the accompaniment by the operation of R-L.

However, since the accompaniment of the both channels is not completely the same in amplitude, it is desirable to adjust the amplitude of the L channel signal before R-L operation to equalize the amplitude of the accompaniment of both channels.

Figure 19:
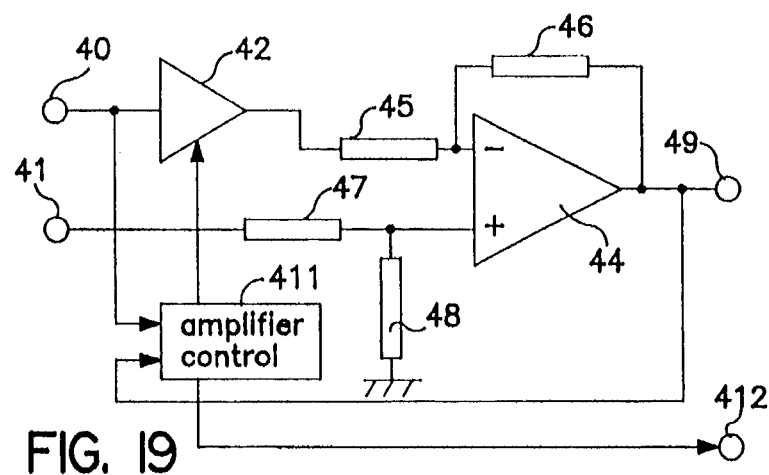
FIG. 19 is a block diagram showing an example of vocal signal extracting means.

FIG. 19 shows an example of a model vocal extracting means 401. In addition to the model vocal extracting means (FIG. 2) in the first embodiment, the information concerning the model vocal extraction is issued to a terminal 412. The adjustment of the amplitude of the L channel signal is effected by controlling an amplifier 42 so that the output of an output end 49 may be zero in the introductory portion without vocal, as explained in the first embodiment.

Figure 20:
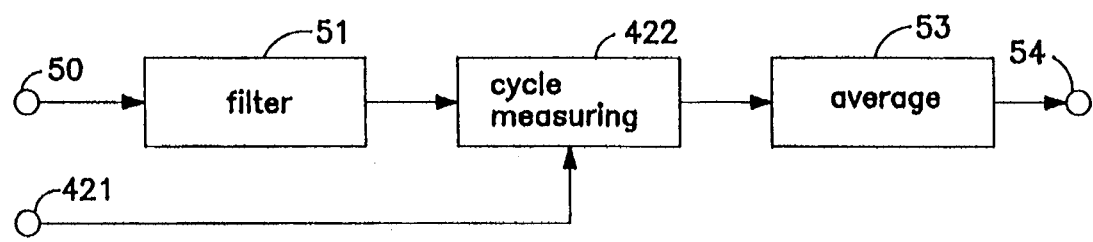
FIG. 20 is a block diagram showing an example of another vocal signal extracting means.

FIG. 20 shows an example of first measuring means 31 and second measuring means 32. In FIG. 3 explained in the first embodiment, an input end 421 for controlling cycle measuring means 422 is added.

While the model vocal extracting means 30 is extracting a model vocal signal, of course, model vocal signal is not present yet. The model vocal extracting means 30 feeds the information that model vocal signal is not extracted yet to the input end 421 in FIG. 20, and stops the operation of the cycle measuring means 422. This is to prevent erroneous tune comparison by the first measuring means 31 and second measuring means 32 in FIG. 18.

Feeding the information into the operating means 33, it is also possible to prevent erroneous tune comparison before extraction of model vocal signal.

8th Exemplary Embodiment

Figure 21:
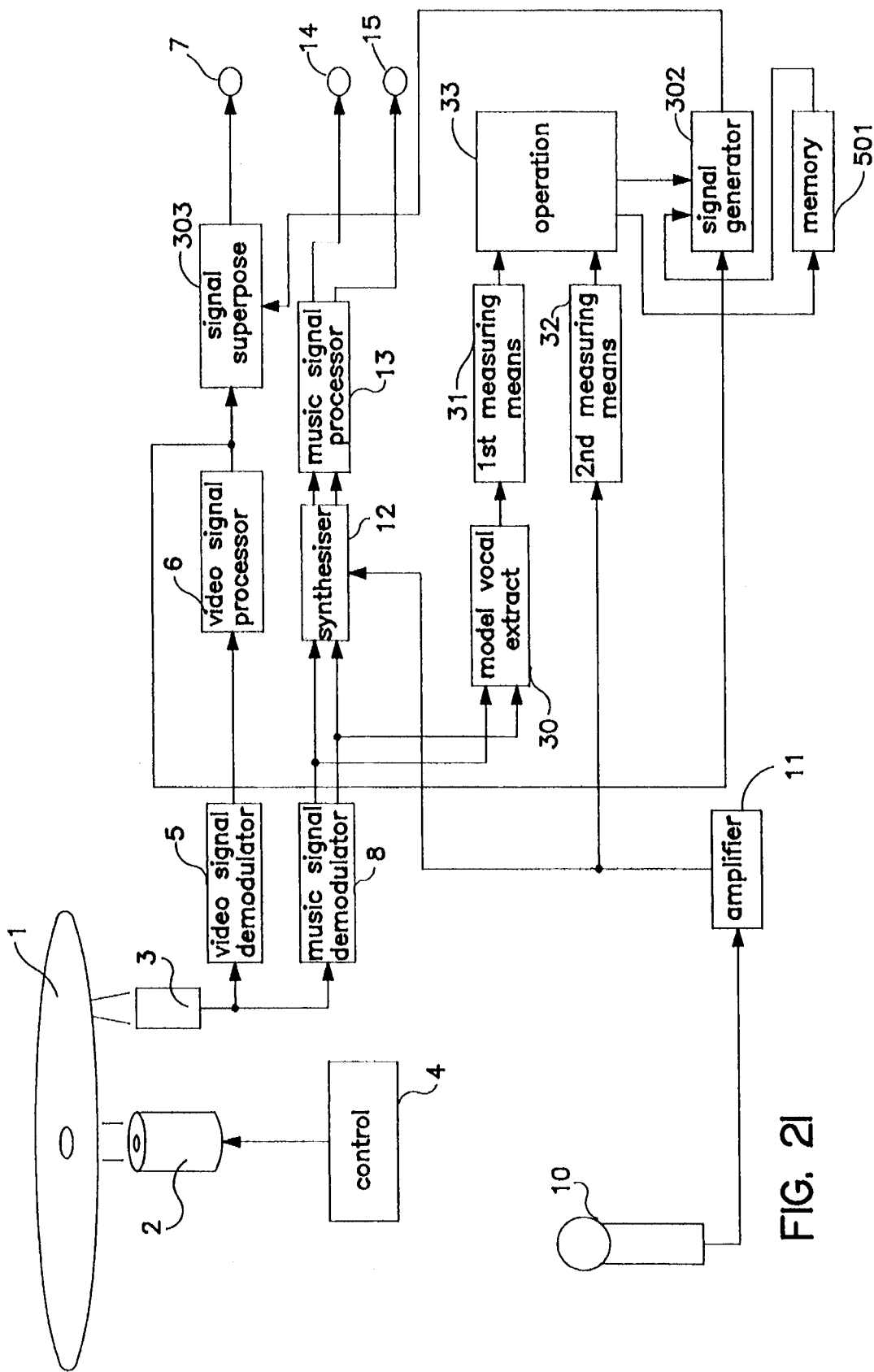
FIG. 21 is a block diagram showing an eighth exemplary embodiment of the present invention.

FIG. 21 shows an eighth exemplary embodiment of the invention.

Memory means 501 stores the operation data from operating means 33.

A signal generator 502 generates a display pattern by arranging the latest operation data from the operating means 33 and the operation data stored in the memory means 501 in time series.

Figure 22:
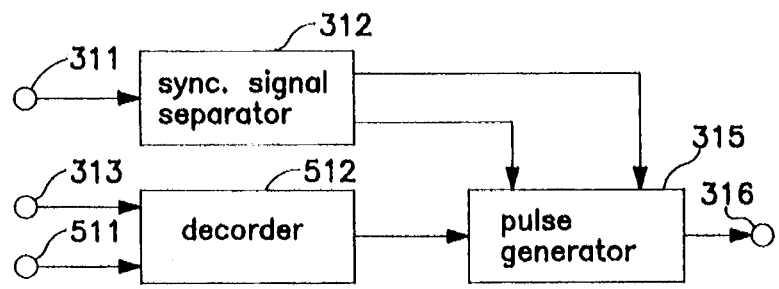
FIG. 22 is a block diagram of an example of a signal generating means.

FIG. 22 shows an example of the signal generator 502.

A synchronous signal separator 312 separates the synchronous signal from the video signal from an input end 311. The latest operation data from operating means 301 is fed into an input end 313, and the operation data stored in the memory means 501 is fed into an input end 511.

A decoder 512 and a pulse generator 315 make up a display pattern by arranging the latest operation data and prior operation data, by the input data of the two systems.

The display pattern is preferred to be displayed in a position not overlaying on the words if displayed in the picture to be superposed.

When the memory means 501 is a FIFO memory, the operation data is stored in the sequence from the latest one. Every time new operation data is taken in, the data arrangement is shifted, and the oldest operation data at the terminal end of the arrangement is pushed away and erased. Therefore, the operation data displayed corresponding to the arrangement of the memory region is arrayed in the time series, coinciding with the progress of the music, so that it is easier to understand.

Figure 23:
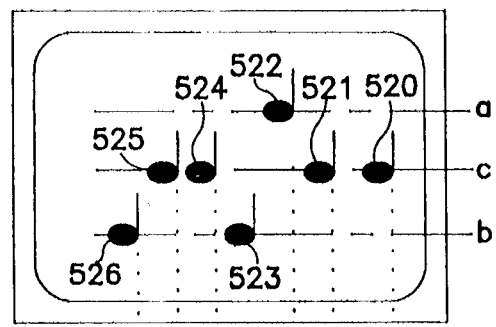
FIG. 23 is a diagram showing an example first screen display in the eighth embodiment.

FIG. 23 expresses a tune error by a note in time series. The latest data from the operating means 33 is displayed at the position of +0, and the operation data stored in the memory means 501 is displayed in the sequence from the latest one, at positions t-1, t-2, t-3, . . . .

A note is at position "c" when the tune error is below the allowance of 520, 521, 524, and 525, at position "a" in the case of a high pitched tune error 522, and at position "b" in the case of a low pitched tune error 523 or 526.

Figure 24:
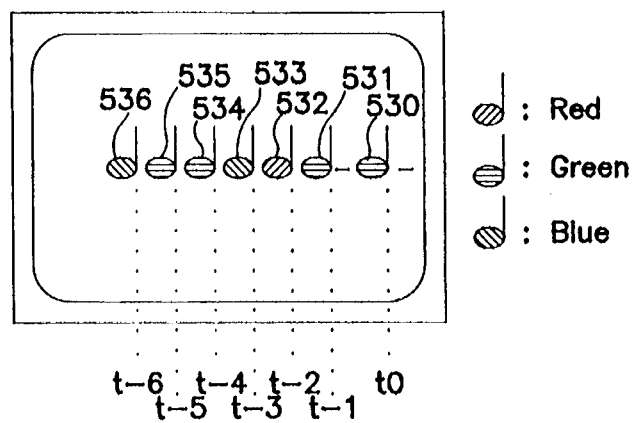
FIG. 24 is a diagram showing an example second screen display in the eighth embodiment.

FIG. 24 shows the result of comparison displayed by the color of note. The display color is green when the tune error is within the allowance of 530, 531, 534, and 535, red in the case of a high pitched tune error 532, and blue in the case of a low pitched tune error 533 or 536.

Figure 25:
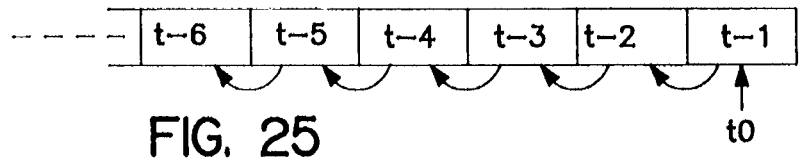
FIG. 25 is a diagram showing an example of memory means operation.
Figure 26:
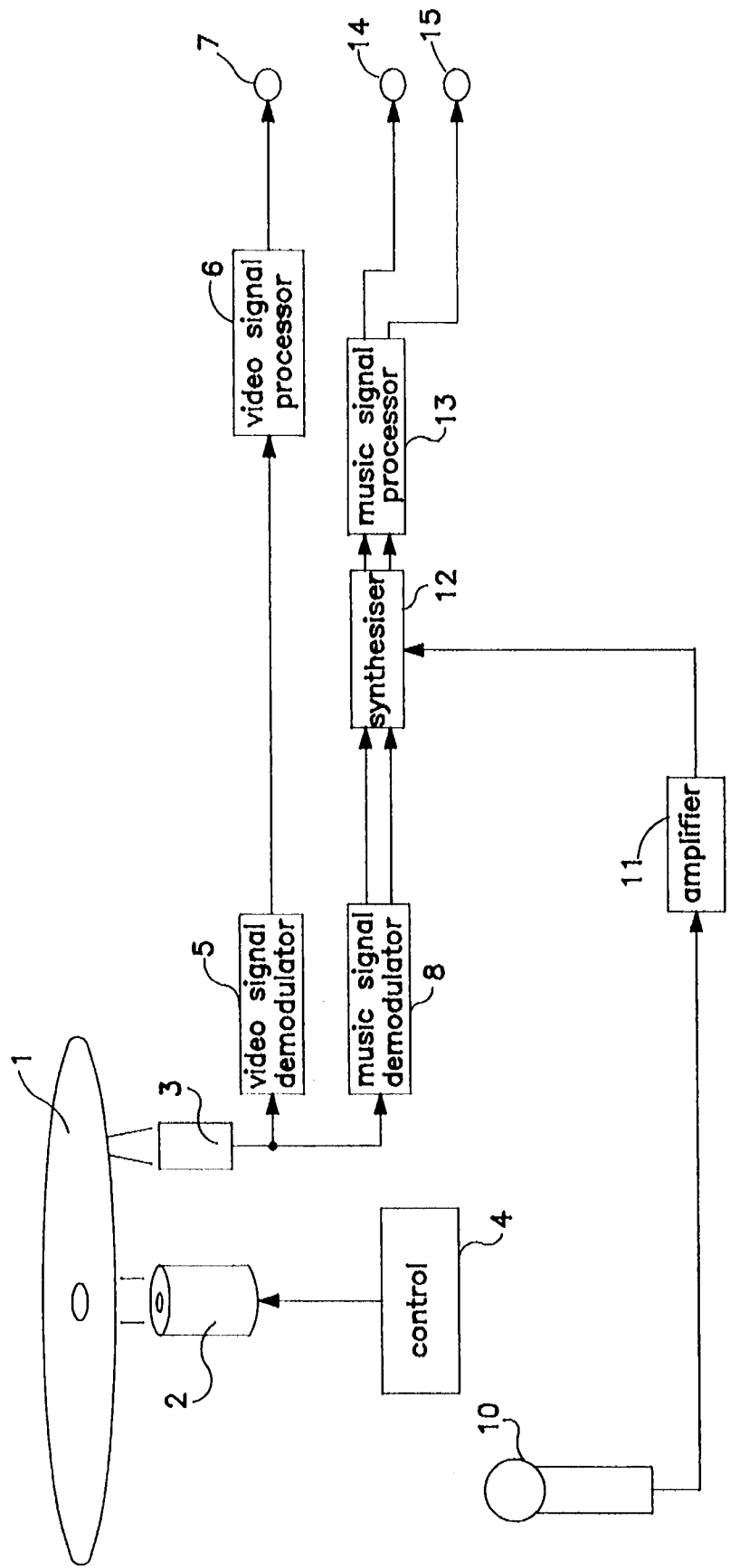
FIG. 26 is a block diagram showing a conventional karaoke apparatus.

In both FIG. 23 and FIG. 24, new operation data is entered from the operating means 33, and every time the display position of +0 is updated, the display position of operation data is changed from +0 to t-1, t-1 to t-2, t-2 to t-3, t-3 to t-4, and so forth. In this case, the exemplary operation of the memory means 501 is shown in FIG. 25.

When storing new data +0 in the memory means 501, first the data of t-n is all moved and stored in the position of t-(n+1). At this time, the data at the leftmost end, that is, the oldest data, is erased. Consequently, +0 is stored at t-1. In this way, every time new operation data is entered from the operating means 33, the data in the memory means 501 is updated.

In this embodiment, since the data display sequence and the data memory sequence are matched, it is easy to control the signal generator 502.

In the foregoing embodiments, the position differing between the model vocal and singer's vocal is recognized by the memory of the singer. In this embodiment, however, it can be recognized on the screen, so that the singer can easily correct his own vocal.

What is claimed:

1. A vocal training apparatus comprising:
    an information medium including a music signal and a video signal, the music signal including a model vocal signal of a human voice and an accompaniment signal,
    reproduction means for reproducing said music signal and said video signal,
    model vocal extracting means for extracting the model vocal signal of the human voice from the music signal, means for receiving a vocal signal from a singer, first measuring means for measuring the vocal characteristics of the model vocal signal of the human voice, second measuring means for measuring the vocal characteristics of the singer's vocal signal, operating means for comparing the singer's vocal characteristics and model vocal characteristics and for generating a control signal corresponding to a result of said comparison, signal generating means for generating a display signal for displaying the result of said comparison, and signal superimposing means for superimposing the display signal on the video signal.

2. A vocal training apparatus according to claim 1, wherein the signal generating means stores the display signal determined according to the result of the comparison until the operating means performs a further comparison.

3. A vocal training apparatus according to claim 1, wherein the signal generating means determines shape, color and position of a picture to be displayed according to the comparison by the operating means.

4. A vocal training apparatus according to claim 1, wherein the signal generating means adds a position change amount in every frame of the video signal.

5. A vocal training apparatus according to claim 1, wherein the signal generating means adds a hue change amount in every frame of the video signal.

6. A vocal training apparatus according to claim 1, wherein the signal generating means generates said display-signal for varying an area of a display pattern corresponding to the result of the comparison determined by the operating means.

7. A vocal training apparatus according to claim 1, wherein the operating means compares the model vocal characteristics and singer's vocal characteristics in each of a plurality of specific time intervals, and adds or subtracts a specific value corresponding to the result of the comparison to or from an initial value N, and wherein the operating means generates a further control signal corresponding to the changed value of the initial value N after the addition or subtraction.

8. A vocal training apparatus according to claim 1, wherein the operating means does not compare the model vocal characteristics and singer's vocal characteristics until the model vocal signal has been extracted.

9. A vocal training apparatus according to claim 1, wherein the first measuring means and second measuring means do not measure the respective model vocal signal and singer's vocal signal until the model vocal signal has been extracted.

10. A vocal training apparatus according to claim 1, wherein said signal superimposing means superimposes the display signal on the video signal to generate a superimposed video signal, said vocal training apparatus further comprising display means for displaying an image corresponding to said display signal superimposed on a further image corresponding to said video signal.

11. A vocal training apparatus according to claim 10, wherein said further image indicates a note by note comparison of at least one of the measured singer's vocal characteristics and at least one of the measured model vocal characteristics as displayed on the display means.

12. A vocal training apparatus comprising:

an information medium including a music signal and a video signal, the music signal including a model vocal signal of a human voice and an accompaniment signal, reproduction means for reproducing said music signal and said video signal, model vocal extracting means for extracting the model vocal signal of the human voice from the music signal, means for receiving a vocal signal from a singer, first measuring means for measuring the vocal characteristics of the model vocal signal of the human voice, second measuring means for measuring the vocal characteristics of the singer's vocal signal, operating means for comparing the singer's vocal characteristics and the model vocal characteristics and for generating a control signal corresponding to a result of said comparison, memory means for storing the control signal, signal generating means for generating a display signal corresponding to the content of the memory means, and signal superimposing means for superimposing the display signal on the video signal.

13. A vocal training apparatus according to claim 12, wherein the display signal to be generated by the signal generating means corresponds to the data stored in the memory means in stored sequence.

14. A vocal training apparatus according to claim 12, wherein said signal superimposing means superimposes the display signal on the video signal to generate a superimposed video signal, said vocal training apparatus further comprising display means for displaying an image corresponding to said display signal superimposed on a further image corresponding to said video signal.

15. A vocal training apparatus according to claim 14, wherein said further image indicates a note by note comparison of at least one of the measured singer's vocal characteristics and at least one of the measured model vocal characteristics as displayed on the display means.

* * * * *